(12) United States Patent
Sawada et al.

(10) Patent No.: US 6,303,951 B1
(45) Date of Patent: Oct. 16, 2001

(54) IMAGE SENSOR OF A MULTI-CHIP TYPE HAVING A PLURALITY OF PHOTOELECTRIC CONVERSION CHIPS

(75) Inventors: Koji Sawada, Atsugi; Hiraku Kozuka, Hiratsuka, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/546,707

(22) Filed: Apr. 10, 2000

(30) Foreign Application Priority Data

Apr. 12, 1999 (JP) .................................................. 11-104175

(51) Int. Cl.⁷ ...................... H01L 31/062; H01L 31/113; H01L 31/0232; H01L 31/0203; H01L 31/107
(52) U.S. Cl. ...................... 257/292; 257/294; 257/432; 257/443; 257/448; 250/208.1
(58) Field of Search ........................... 257/291, 292, 257/294, 432, 443, 448; 250/553, 208.1, 208.2

(56) References Cited

U.S. PATENT DOCUMENTS

| | | | |
|---|---|---|---|
| 5,608,204 | * 3/1997 | Hofflinger et al. | 250/208.1 |
| 6,118,115 | * 9/2000 | Kozuka et al. | 250/208.1 |
| 6,169,286 | * 1/2001 | Singh | 250/370.08 |
| 6,201,573 | * 3/2001 | Mizuno | 348/308 |

FOREIGN PATENT DOCUMENTS

| | | |
|---|---|---|
| 6-189065 | 7/1994 | (JP) . |
| 9-205588 | 8/1997 | (JP) . |

* cited by examiner

*Primary Examiner*—Ngân V. Ngô
(74) *Attorney, Agent, or Firm*—Fitzpatrick, Cella, Harper & Scinto

(57) ABSTRACT

Photoelectric conversion chips having the same structure are disposed in line and electrically connected together to constitute a multi-chip type image sensor. The gate of a load transistor of a source follower circuit of each of the photoelectric conversion chips is connected in common to one constant current source circuit. The constant current source circuit and photoelectric conversion chips are mounted on a substrate. With this structure, the common current source circuit is used for all the source follower circuits so that noises will not be generated on the photoelectric conversion chip unit basis. The multi-chip type image sensor can therefore improve the image quality, and horizontal or vertical stripes to be caused by noises otherwise generated in separate constant current source circuits can be removed.

7 Claims, 9 Drawing Sheets

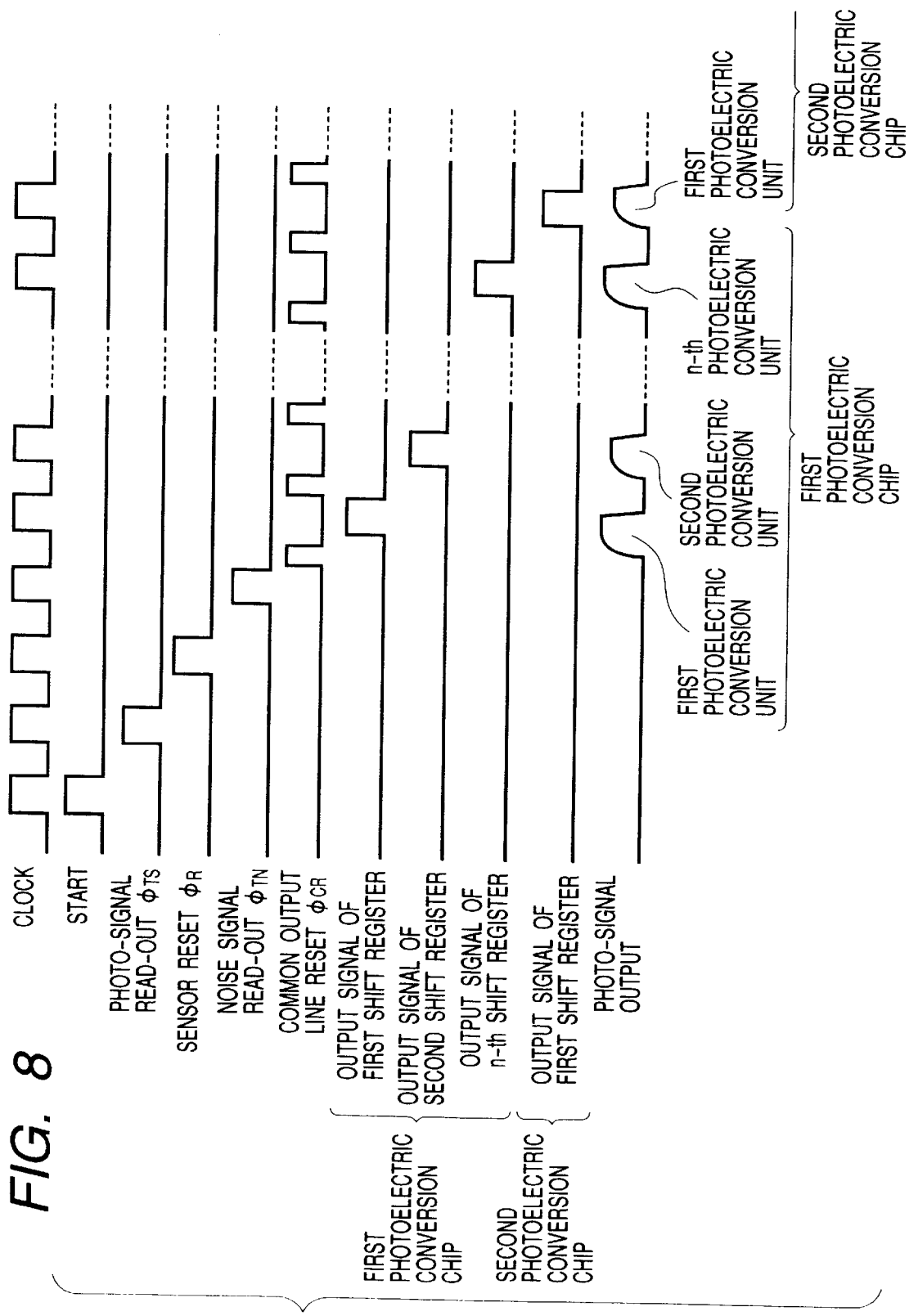

IMAGE SENSOR OF A MULTI-CHIP TYPE HAVING A PLURALITY OF PHOTOELECTRIC CONVERSION CHIPS

BACKGROUND OF THE INVENTION

1. Field of the Invention

The present invention relates to an image sensor of a multi-chip type having a plurality of photoelectric conversion chips.

2. Related Background Art

Linear image sensors have been used as a reading apparatus of a facsimile, a scanner or the like. Photoelectric conversion chips of a linear image sensor are formed on a silicon wafer. A length of the linear image sensor is therefore limited by the size of a wafer, and in many cases, only short-length liner image sensors can be formed. In this case, a reading apparatus using only one photoelectric conversion chip reduces an image of light reflected from an original by using an optical system and projects it on the chip to read the image. If such a reduction optical system is used, it is necessary to reserve a large space of the optical system and the size of the reading apparatus cannot be made compact. In order to solve this problem, a multi-chip type image sensor has been proposed having a plurality of photoelectric conversion chips disposed linearly.

Techniques regarding this field are disclosed, for example, in the publications of JP-A-6-189065 and JP-A9-205588.

FIG. 1 is a block diagram showing a conventional multi-chip type image sensor using a plurality of photoelectric conversion chips. FIG. 2 is a circuit diagram of one pixel of the multi-chip type image sensor. FIG. 3 is a timing chart illustrating the operation of the multi-chip type image sensor.

In FIG. 1, reference numeral 1 represents a photoelectric conversion chip. A plurality of photoelectric conversion chips are mounted on a substrate and connected electrically to form a multi-chip type image sensor. Reference numeral 2 represents a photoelectric conversion element for converting an input photo-signal into an electric charge signal. Photoelectric conversion chips shown in FIG. 1 are herein called a first photoelectric conversion chip, a second photoelectric conversion chip, . . . , beginning with the leftmost chip. It is assumed that each photoelectric conversion chip has n pixels or n photoelectric conversion elements which are called herein from the leftmost element a first photoelectric conversion element, a second photoelectric conversion element, . . . By disposing a plurality of photoelectric conversion elements, the multi-chip type image sensor can have a large effective read width and can process a large size original.

A timing circuit 10 generates control signals for the image sensor operation by receiving a clock signal 111 and a start signal 122.

When a MOS switch 4 turns on in response to a photo-signal read pulse, the photo-signal is read out and stored in a storage capacitor 6. The photo-signal is obtained by voltage-amplifying an electric charge signal converted by the photoelectric conversion element 2 by a source follower circuit 3 constituted of transistors 3a and 3b.

Thereafter, the photoelectric conversion element 2 is reset to start again storing the photo-signal.

At the same time when this storage operation starts, a shift register 7 sequentially turns on a MOS switch 5 synchronously with the clock signal 122 to read the photo-signal from the storage capacitor 6 and output it via an output buffer 9 to an output terminal 13.

After the photo-signal is read and output and when the start signal is supplied from the external, the next cycle of the photo-signal reading and storing starts and the above-described operation is repeated.

Each photoelectric conversion chip 1 has a constant current circuit 8 for controlling the current flowing through the source follower circuit 3. If all the source follower circuits of all chips are made fully operable while the photo-signal is read from each photoelectric conversion chip, the total consumption current becomes large. In order to avoid this, the consumption current flowing through the photoelectric conversion chips other than the chip whose photo-signal is presently read is suppressed by limiting the current of the constant current sources circuits.

A photo-signal output from the conventional multi-chip type image-sensor constructed as above contains random noises and fixed pattern noises (FPNs) generated in the photoelectric conversion elements and source follower circuits in addition to random noises and FPNs generated in the constant current source circuits. Noises generated in the constant current source circuit affect all other photoelectric conversion elements in the same photoelectric conversion chip, and the photo-signal varies with each photoelectric conversion chip because there is a variation in the characteristics of the chips. Therefore, when such photo-signals are displayed as an image, vertical or horizontal stripes appear on the photoelectric conversion chip basis. These stripes are very easy to be visually recognized, which becomes a main factor of a degraded image quality. This phenomenon is inherent to multi-chip type image sensors.

SUMMARY OF THE INVENTION

It is an object of the invention to improve the quality of an image taken with an image sensor.

In order to achieve the above object, according to aspect of the invention, there is provided an image sensor comprising: a plurality of photoelectric conversion chips electrically connected together, each photoelectric conversion chip including a plurality of pixels each being provided with a photoelectric conversion element and reading means for reading a signal from the photoelectric conversion element; and a bias circuit for supplying a bias level to operate the reading means, wherein the bias circuit supplies a common bias level to a plurality of reading means contained in each of the plurality of photoelectric conversion chips.

The other objects and features of the present invention will become more apparent from the following detailed description of the embodiments when read in conjunction with the accompanying drawings.

BRIEF DESCRIPTION OF THE DRAWINGS

FIG. 8 is a timing chart illustrating the operation of the image sensor according to the fourth embodiment of the invention.

DETAILED DESCRIPTION OF THE PREFERRED EMBODIMENTS

Embodiments of the invention will be described with reference to the accompanying drawings.

Figure 1:
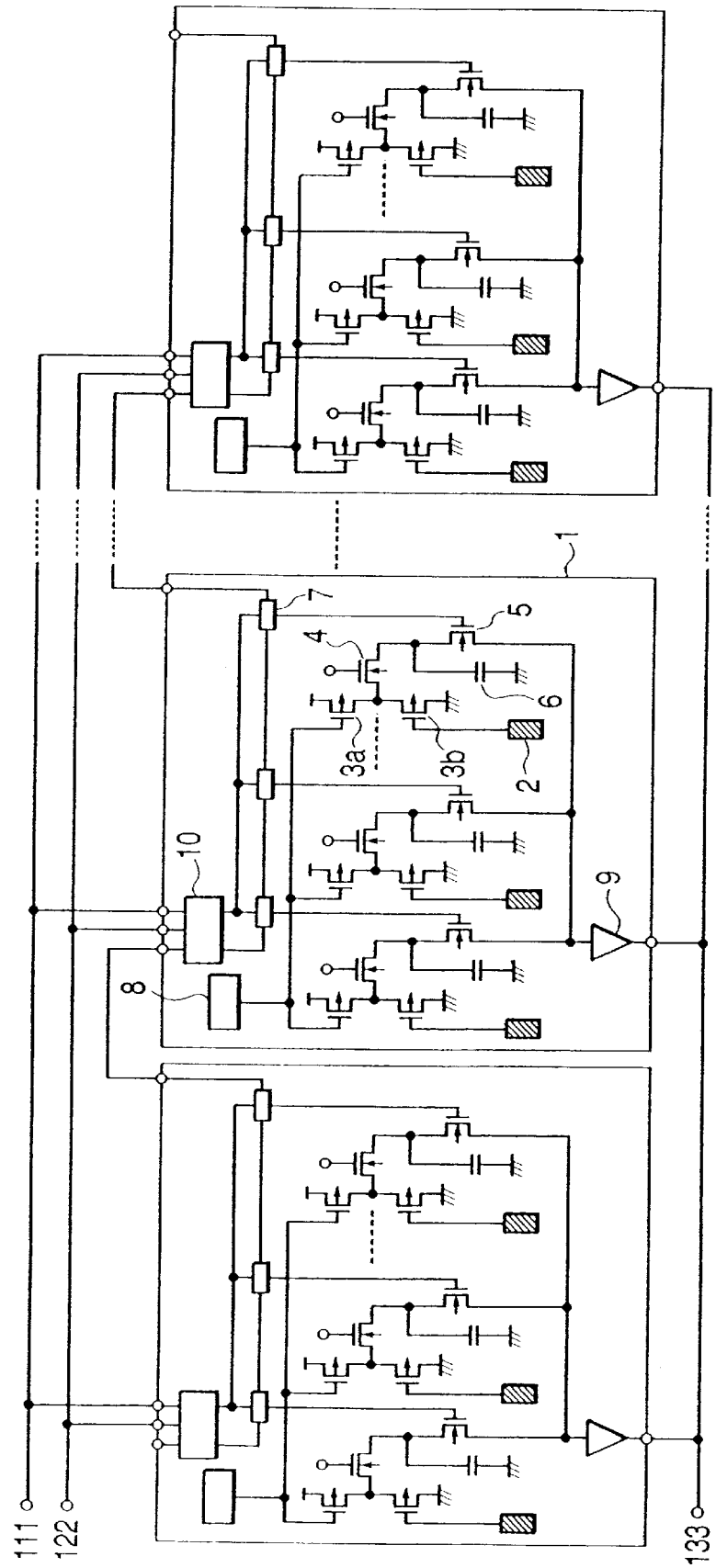
FIG. 1 is a block diagram showing a conventional multi-chip type image sensor using a plurality of photoelectric conversion chips.
Figure 2:
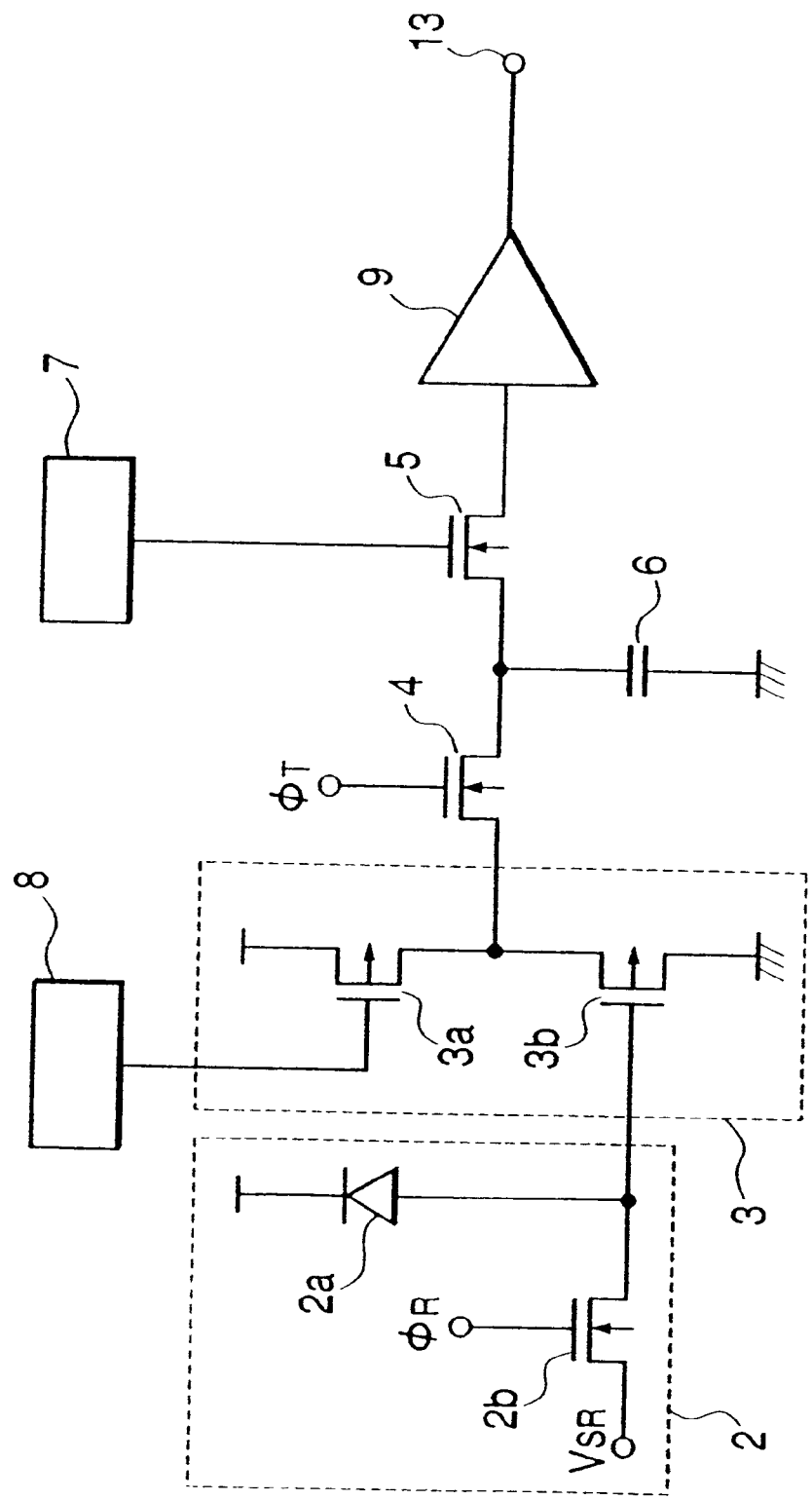
FIG. 2 is a circuit diagram of one pixel of the multi-chip type image sensor shown in FIG. 1.
Figure 3:
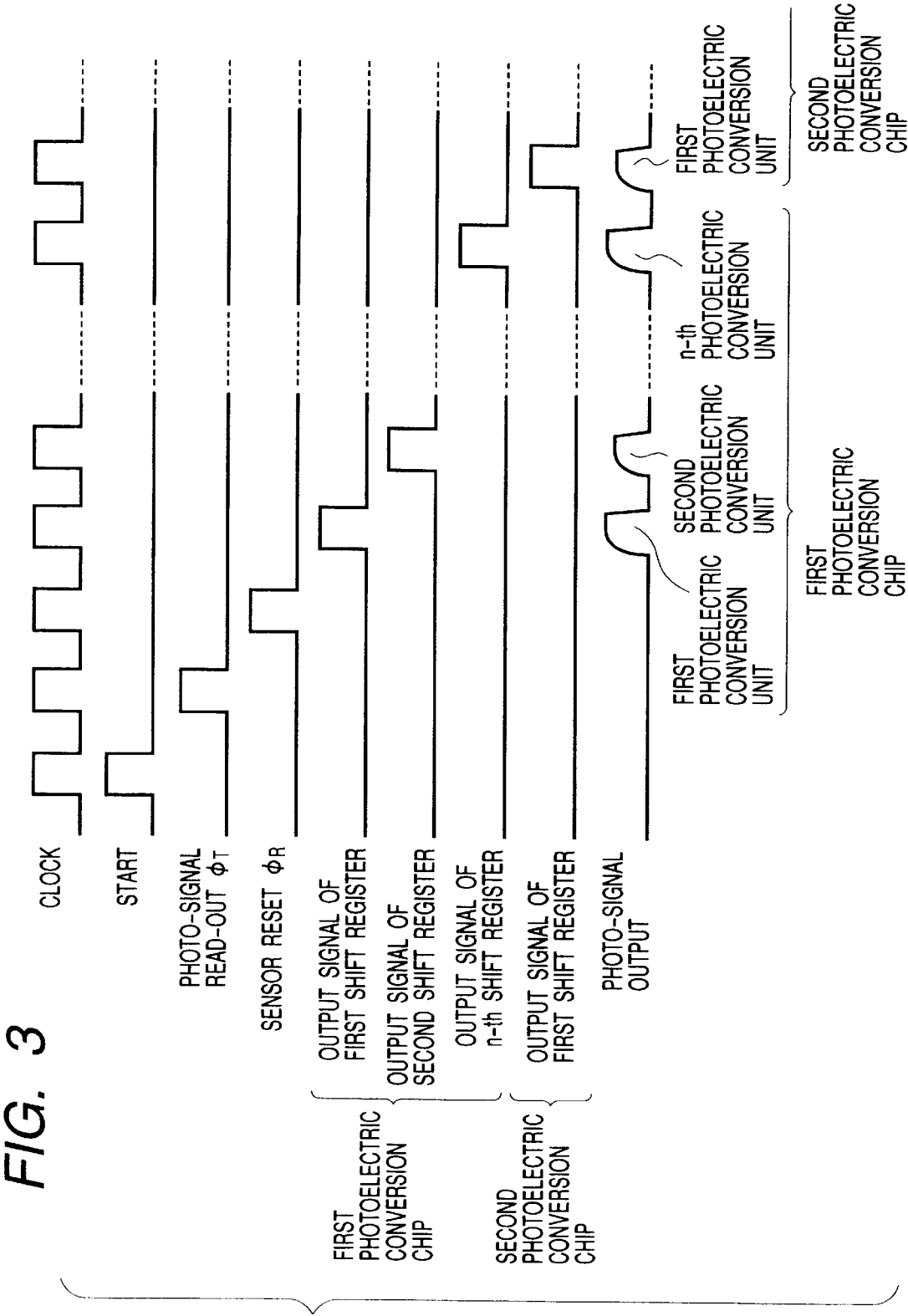
FIG. 3 is a timing chart illustrating the operation of the multi-chip type image sensor.
Figure 4:
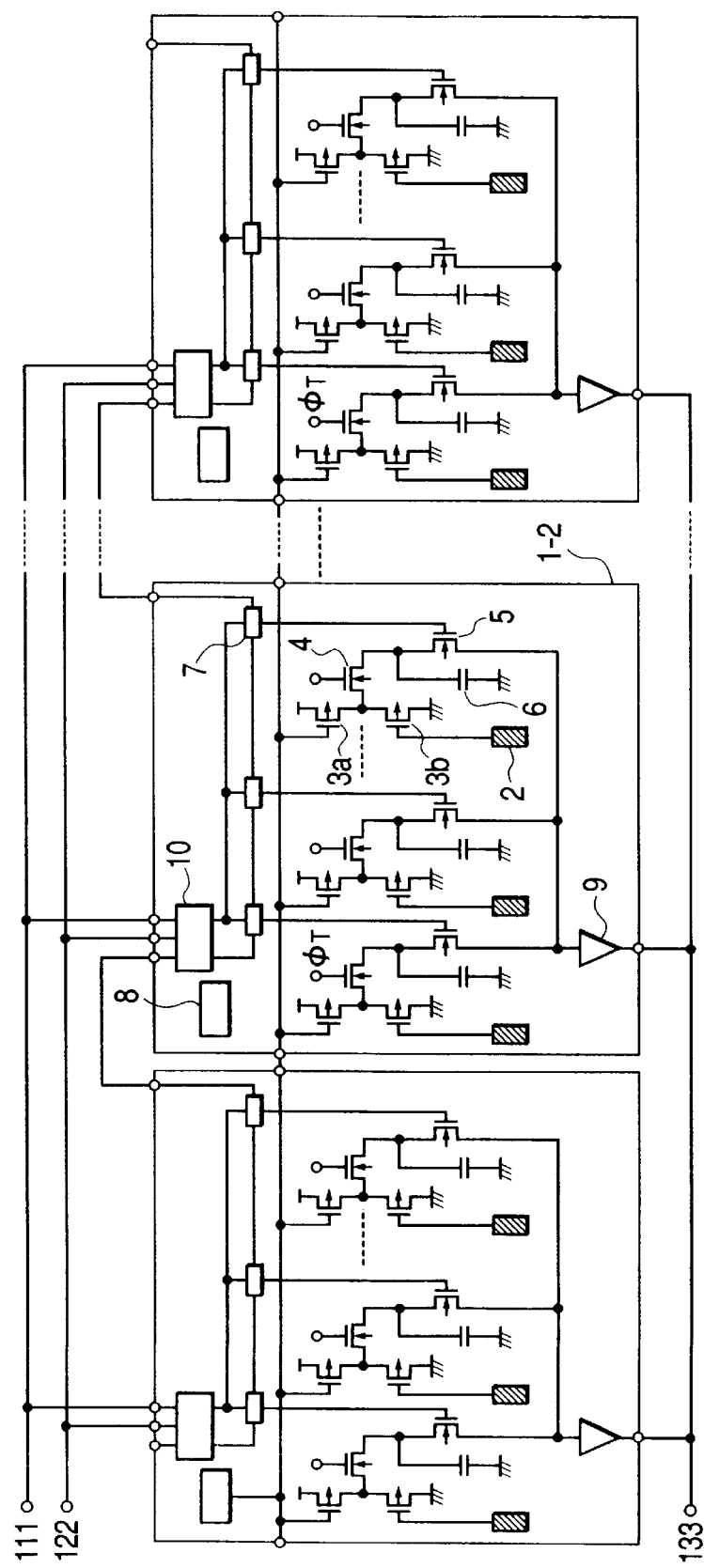
FIG. 4 is a block diagram showing the structure of an image sensor according to a first embodiment of the invention.

FIG. 4 is a circuit diagram showing electrical connections of photoelectric conversion chips according to a first embodiment of the invention. The equivalent circuit of one pixel of this image sensor is similar to that shown in FIG. 2, and the operation timing chart of this image sensor is similar to that shown in FIG. 3.

As shown in FIG. 4, photoelectric conversion chips 1 are disposed in line and electrically connected together to constitute a multi-chip type image sensor.

A photoelectric conversion element 2 converts an input photo-signal into an electric charge signal.

In this multi-chip type image sensor, a timing circuit 10 receives a clock signal 111 and a start signal 122 and generates control signals for controlling the operation of the sensor.

Upon reception of the start signal, the image sensor generates a photo-signal read pulse. In response to this photo-signal read pulse, a MOS switch 4 is turned on to read a photo-signal and store it in a storage capacitor 6. The photo-signal is obtained by converting an electric charge signal converted by the photoelectric conversion element 2 into voltage amplitude by a source follower circuit 3.

Next, the photoelectric conversion element 2 is reset to start again storing the photo-signal.

At the same time when this storage operation starts, a shift register 7 sequentially turns on a MOS switch 5 synchronously with the clock signal 122 to read the photo-signal from the storage capacitor 6 and output it via an output buffer 9 to an output terminal 13.

After the photo-signal is read and output and when the start signal is supplied from the external, the next cycle of the photo-signal reading and storing starts and the above-described operation is repeated.

Each photoelectric conversion chip 1 has the same structure and is provided with a constant current circuit 8. The gate of a load transistor 3a of the source follower circuit 3 of each of the photoelectric conversion chips is connected in common to one constant current source circuit. With this structure, the common current source circuit is used for all the source follower circuits so that noises will not be generated on the photoelectric conversion chip unit basis and the image quality can be improved.

In the structure shown in FIG. 4, only the leftmost photoelectric conversion chip 1 has the constant current source circuit made active. The leftmost photoelectric conversion chip 1 illustratively shown in FIG. 4 is only one example of the present embodiment, it is sufficient that any one of the photoelectric conversion chips 1 has the constant current source circuit made active and connected to each of the load transistors 3a of the source follower circuits.

As a method of selectively connecting the constant current source circuit and source followers in each photoelectric conversion chip, an external control signal for enabling or disabling such connection may be supplied to the photoelectric conversion chip, a ROM for enabling or disabling such connection may be provided in the chip, or laser trimming or the like may be performed for enabling or disabling such connection. These methods are not limitative but other suitable methods may also be used. The conductivity type of MOS transistors and those in the source follower circuit is not limited, and the type of the constant current circuit is not limited. As light receiving elements of the photoelectric conversion element, photo diodes, photo transistors and the like may be used which are intended to be not limitative.

Figure 5:
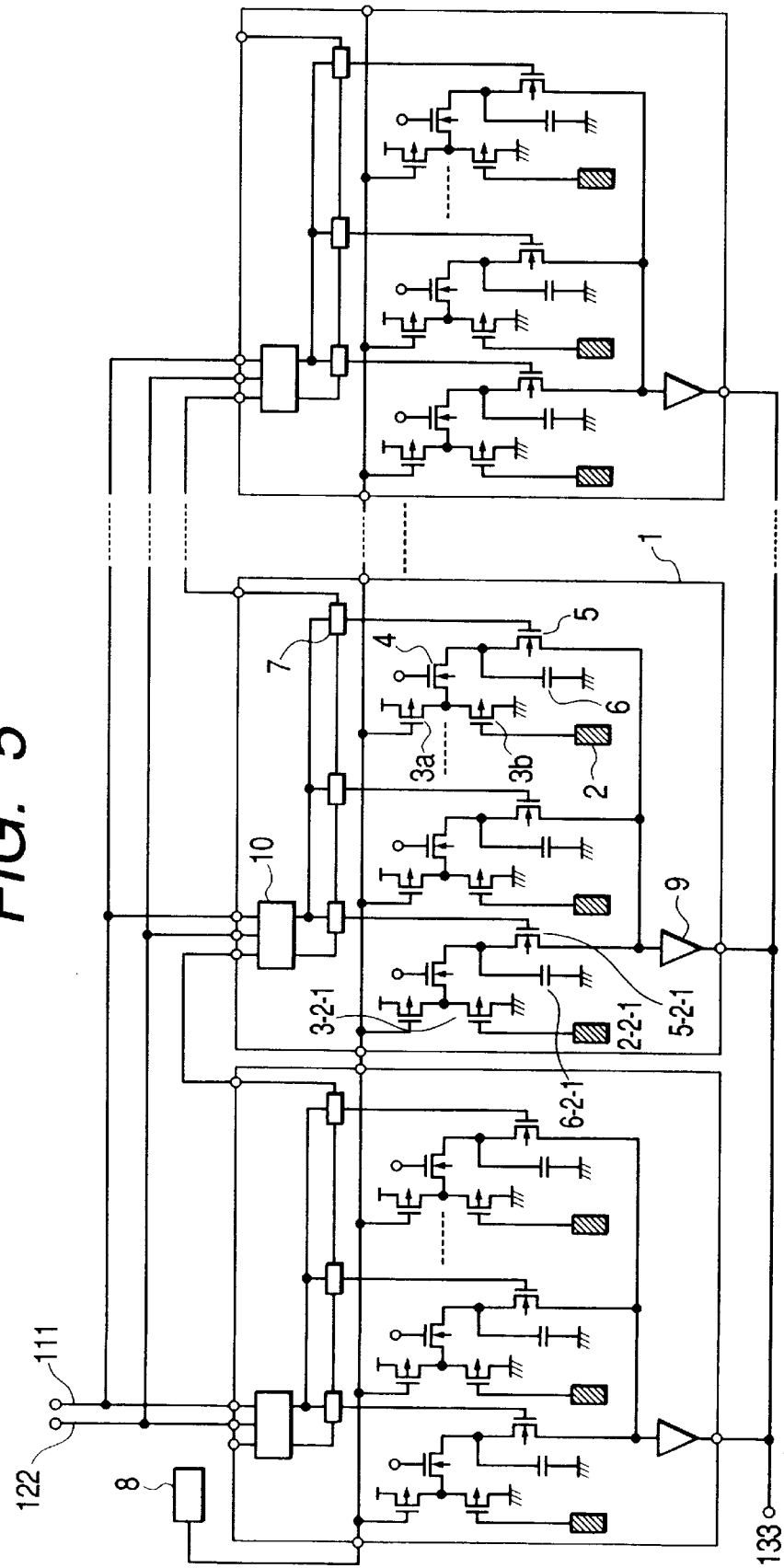
FIG. 5 is a block diagram showing the structure of an image sensor according to a second embodiment of the invention.

FIG. 5 is a block diagram showing the structure of a second embodiment of the invention.

As shown in FIG. 5, photoelectric conversion chips 1 are disposed in line and electrically connected together to constitute a multi-chip type image sensor. Each photoelectric conversion chip 1 has the same structure. A constant current circuit 8 is not provided in each photoelectric conversion chip 1, but is fabricated on a mount substrate of the image sensor. The constant current circuit 8 is connected to the gate of a load transistor 3a of the source follower circuit 3 of each of the photoelectric conversion chips.

With this structure, the common current source circuit is used for all the source follower circuits so that noises will not be generated on the photoelectric conversion chip basis and the image quality can be improved.

Since the constant current source circuit is not provided in each photoelectric conversion chip, the cost of the chip can be reduced.

Figure 6:
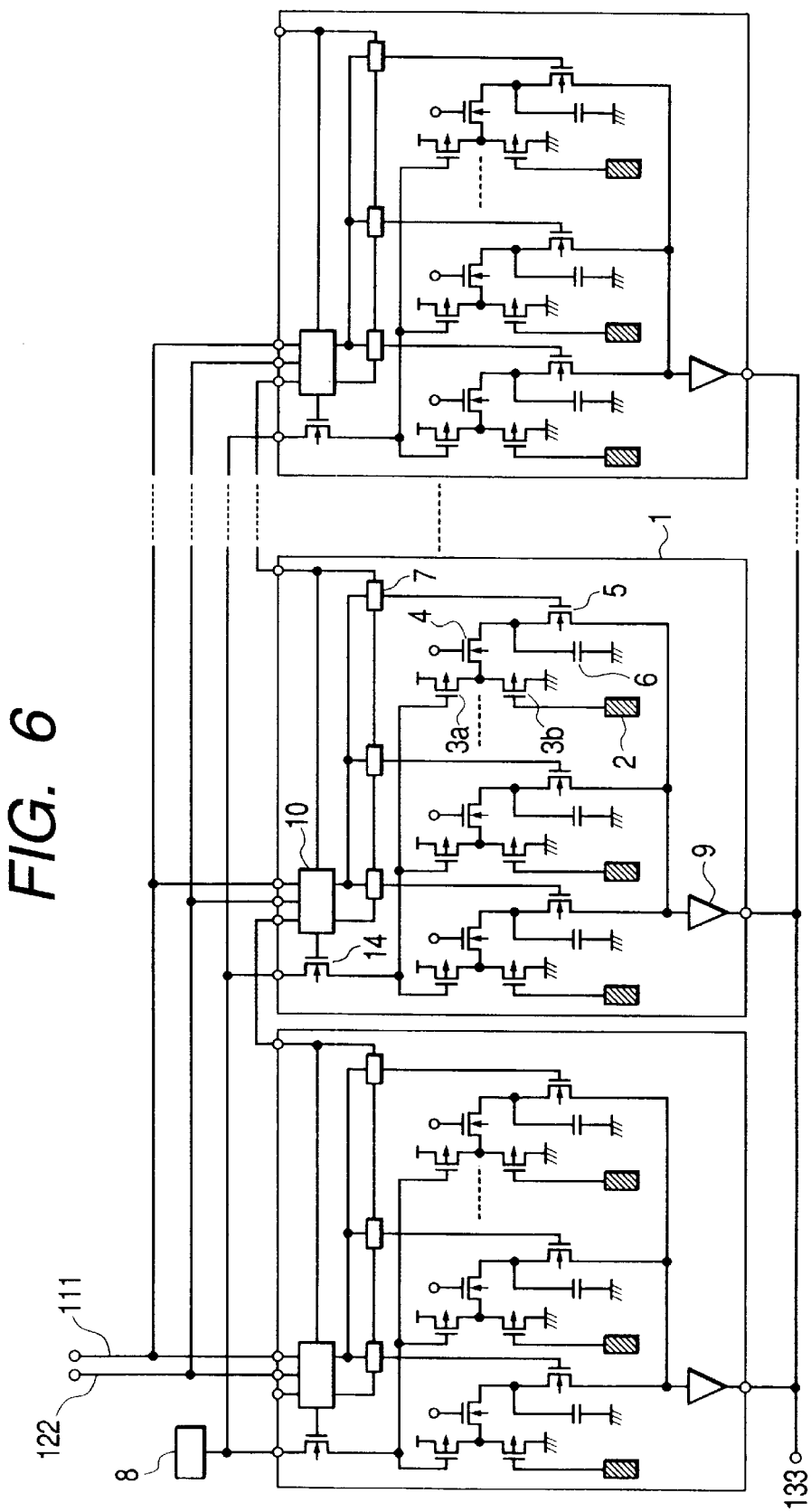
FIG. 6 is a block diagram showing the structure of an image sensor according to a third embodiment of the invention.

FIG. 6 is a block diagram showing the structure of a third embodiment of the invention.

As shown in FIG. 6, photoelectric conversion chips 1 are disposed in line and electrically connected together to constitute a multi-chip type image sensor. Each photoelectric conversion chip 1 has the same structure. A constant current circuit 8 is not provided in each photoelectric conversion chip 1, but is fabricated on a mount substrate of the image sensor. The constant current circuit 8 is connected to each of the photoelectric conversion chips 1.

Each photoelectric conversion chip 1 has a MOS switch 14 which connects the constant current source circuit 8 to the source follower circuit of the chip. A timing circuit 10 controls so that only the MOS transistor 14 of the photoelectric conversion chip which reads the photo-signal is made conductive, and MOS switches of the other photoelectric conversion chips are not made conductive. It is therefore possible to limit unnecessary current flowing through source follower circuits not reading the photo-signal and to suppress the consumption current of the source follower circuits. Since only one common current source circuit is used for all the source follower circuits, noises will not be generated on the photoelectric conversion chip basis and the image quality can be improved.

Figure 7:
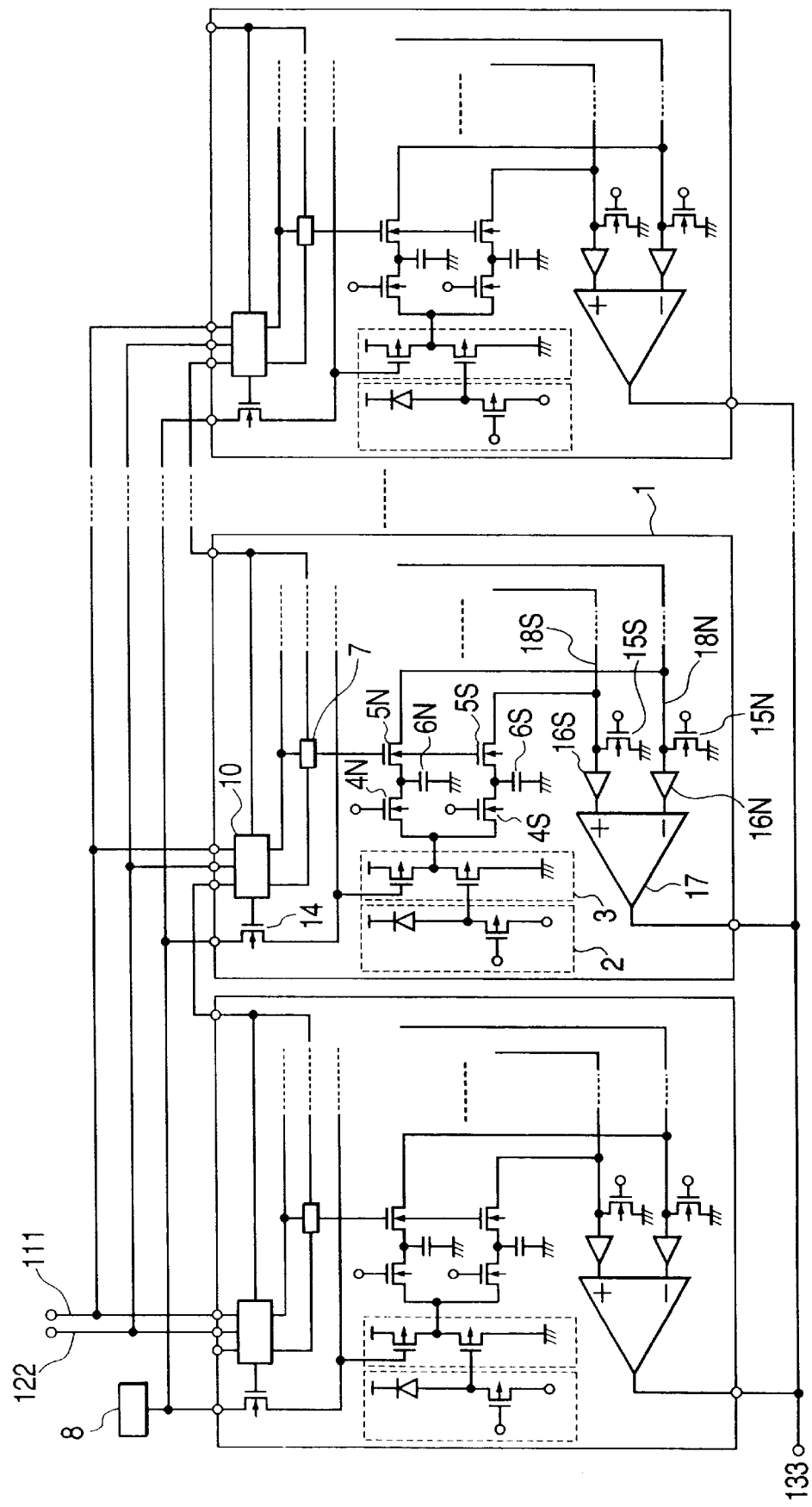
FIG. 7 is a block diagram showing the structure of an image sensor according to a fourth embodiment of the invention.

FIG. 7 is a block diagram showing the structure of a fourth embodiment of the invention, and FIG. 8 is a timing chart illustrating the operation of the fourth embodiment.

As shown in FIG. 7, photoelectric conversion chips 1 are disposed in line and electrically connected together to constitute a multi-chip type image sensor.

In this multi-chip type image sensor, a timing circuit 10 receives a clock signal 111 and a start signal 122 and generates control signals for controlling the operation of the image sensor.

Upon reception of the start signal, the image sensor turns on a MOS switch 4S to read the photo-signal and store it in a storage capacitor 6S. The photo-signal is obtained by converting an electric charge signal converted by the photoelectric conversion element 2 into voltage amplitude by a source follower circuit 3.

Subsequently, the photoelectric conversion element 2 is reset. In order to read a noise signal when the photoelectric conversion element 2 is reset, a MOS switch 4N is turned on to read the noise signal and store it in a storage capacitor 6N. After the photoelectric conversion element 2 is reset, the element starts again storing a photo-signal charge.

At the same time when this storage operation starts, a shift register 7 starts scanning synchronously with the clock signal to read the photo-signal. First, MOS switches 15S and 15N are turned on to reset common output lines 18S and 18N. Thereafter, MOS switches 5S and 5N are turned on to output the photo-signal stored in the storage capacitor 6S and the noise signal stored in the storage capacitor 6N respectively to the common output lines 18S and 18N. These signals are input via voltage followers 16S and 16N to a differential amplifier 17 which outputs a signal to an output terminal 133. The reset operation for the common output lines and the signal read operation are repeated from the first to last pixels in the photoelectric conversion chip 1. With this operation, fixed pattern noises (FPNs) contained in the photo-signal and caused by a variation of threshold values of MOS transistors can be avoided.

After the photo-signal is read and output and when the start signal is supplied from the external, the next cycle of the photo-signal reading and storing starts and the above-described operation is repeated.

A constant current circuit 8 is fabricated on a mount substrate of the image sensor. The constant current circuit 8 is connected in common to each of the photoelectric conversion chips 1. Each photoelectric conversion chip 1 has a MOS switch 14 which connects the constant current source circuit 8 to the source follower circuit of the chip. A timing circuit 10 controls in such a manner that only the MOS transistor 14 of the photoelectric conversion chip which reads the photo-signal is made conductive, and MOS switches of the other photoelectric conversion chips are not made conductive. It is therefore possible to limit unnecessary current flowing through source follower circuits not reading the photo-signal and suppress the consumption current of the source follower circuits. Since only one common current source circuit is used for all the source follower circuits, noises will not be generated on the photoelectric conversion chip unit basis and the image quality can be improved.

Figure 9A:
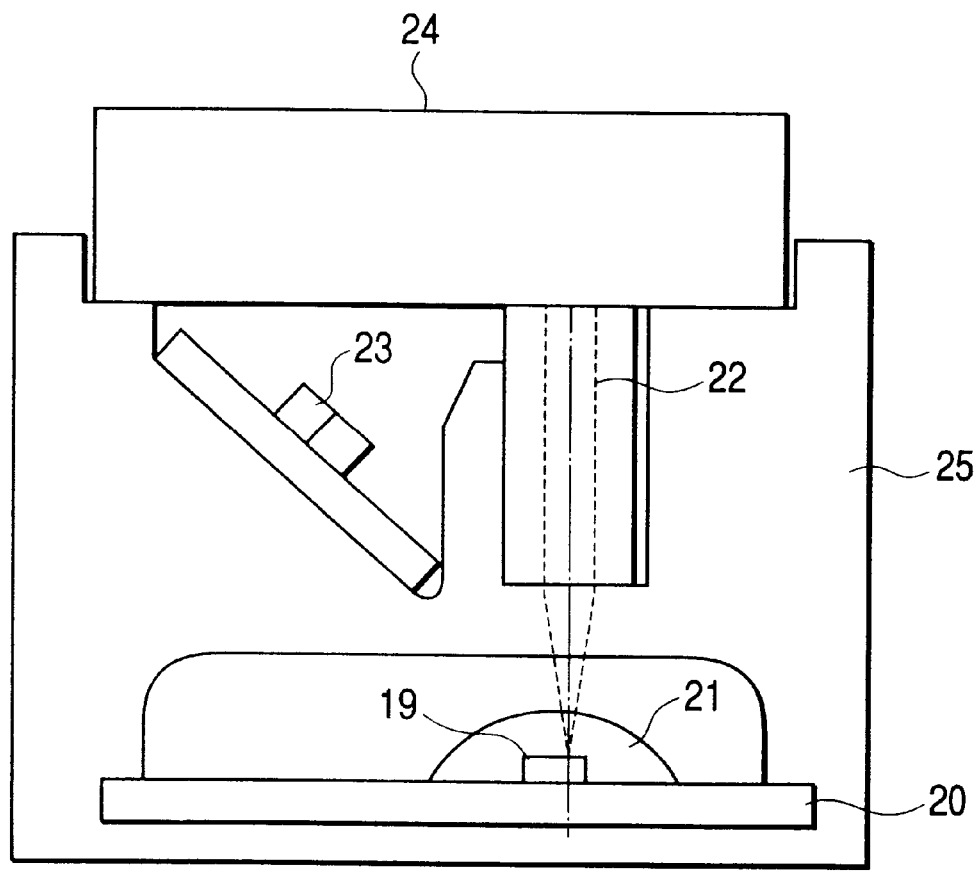
FIGS. 9A and 9B are diagrams showing the structure of a contact type image sensor unit using an image sensor of this invention.
Figure 9B:
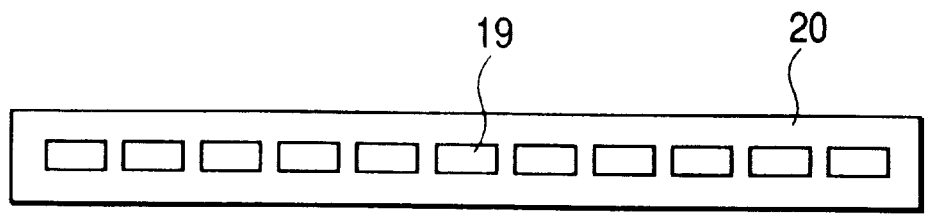

FIGS. 9A and 9B are schematic diagrams showing the structure of a contact type image sensor unit using a multi-chip type image sensor of this invention. FIG. 9A is a cross sectional view of the contact type image sensor unit, and FIG. 9B is an enlarged view of a mount substrate.

A plurality of photoelectric conversion chips 19 are disposed in line on a mount substrate 20 such as a ceramic substrate and a glass epoxy substrate, and electrically connected to wiring patterns formed on the mount substrate 20 by wire bonding. In order to protect the photoelectric conversion chips 19, they are covered with chip coating agent 21 made of silicon resin or the like. The contact type image sensor unit of a light source switching type is configured by assembling: the mount substrate 20; a lens array 22 for converging light reflected from an original and focussing it onto an image sensor surface; LED light sources 23 for radiating red, green and blue light beams; an original support member 24 made of transparent material; and a housing 25.

While only a red light beam is radiated from the LED light sources 23, red information is read by driving the photoelectric conversion chips 19. Next, while only a green light beam is radiated from the LED light sources 23, green information is read. Lastly, only the blue LED is turned on to read blue information. In this manner, an image of a color original can be read.

According to the above-described embodiments, a single constant current source circuit for controlling the current flowing through source follower circuits is used in common for all photoelectric conversion chips. Accordingly, random noises and FPNs appearing in the photoelectric conversion chip unit basis can be reduced and the image quality of the multi-chip type image sensor can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensor comprising:
   a plurality of photoelectric conversion chips electrically connected together, each photoelectric conversion chip including a plurality of pixels each being provided with a photoelectric conversion element and reading means for reading a signal from said photoelectric conversion element; and
   a bias circuit for supplying a bias level to operate said reading means,
   wherein said bias circuit supplies a common bias level to a plurality of reading means contained in each of said plurality of photoelectric conversion chips.

2. An image sensor according to claim 1, wherein said reading means includes a source follower circuit.

3. An image sensor according to claim 2, wherein said bias circuit includes a constant current source circuit which supplies the common bias level to a load transistor of said source follower circuit.

4. An image sensor according to claim 1, wherein said bias circuit is disposed outside said plurality of photoelectric conversion chips.

5. An image sensor according to claim 1, wherein said bias circuit is provided in each of said plurality of photoelectric conversion chips, and the bias circuit provided in any one of said plurality of photoelectric conversion chips supplies the common bias level.

6. An image sensor according to claim 1, wherein each of said plurality of photoelectric conversion chips includes a plurality of storage means for storing a signal supplied from each of said plurality of pixels and scan means for sequentially scanning the signals stored in said plurality of storage means.

7. An image input apparatus comprising:
   a plurality of photoelectric conversion chips electrically connected together, each photoelectric conversion chip including a plurality of pixels each being provided with a photoelectric conversion element and reading means for reading a signal from said photoelectric conversion element;
   a bias circuit for supplying a bias level to operate said reading means, wherein said bias circuit supplies a common bias level to a plurality of reading means contained in each of said plurality of photoelectric conversion element;
   a light source for illuminating an object; and
   a lens for converging light reflected from the object and focussing the light upon said plurality of photoelectric conversation chips.

* * * * *